(12) United States Patent
Köffers et al.

(10) Patent No.: US 12,370,759 B2
(45) Date of Patent: Jul. 29, 2025

(54) METHOD FOR PRODUCING A COMPONENT FROM A FIBER-COMPOSITE MATERIAL

(71) Applicant: SIEMPELKAMP MASCHINEN-UND ANLAGENBAU GMBH, Krefeld (DE)

(72) Inventors: Fabian Köffers, Krefeld (DE); Michael Schöler, Rheurdt (DE); Klaus Schürmann, Jüchen (DE); Lothar Sebastian, Duisburg (DE)

(73) Assignee: SIEMPELKAMP MASCHINEN-UND ANLAGENBAU GMBH, Krefeld (DE)

( * ) Notice: Subject to any disclaimer, the term of this patent is extended or adjusted under 35 U.S.C. 154(b) by 727 days.

(21) Appl. No.: 17/636,962

(22) PCT Filed: Aug. 18, 2020

(86) PCT No.: PCT/EP2020/073054
§ 371 (c)(1),
(2) Date: Feb. 21, 2022

(87) PCT Pub. No.: WO2021/032710
PCT Pub. Date: Feb. 25, 2021

(65) Prior Publication Data
US 2022/0274293 A1  Sep. 1, 2022

(30) Foreign Application Priority Data
Aug. 22, 2019 (DE) .......................... 102019005913.1

(51) Int. Cl.
*B29C 70/44* (2006.01)
*B29C 35/04* (2006.01)
(Continued)

(52) U.S. Cl.
CPC ............ *B29C 70/44* (2013.01); *B29C 35/041* (2013.01); *B29C 66/81455* (2013.01);
(Continued)

(58) Field of Classification Search
CPC .............. B29C 70/44; B29C 2035/043; B29C 66/81459; B29C 66/81455; B30B 5/02
See application file for complete search history.

(56) References Cited

U.S. PATENT DOCUMENTS

| 3,594,877 A | * | 7/1971 | Suda | ....................... B28B 3/024 |
| | | | | 425/389 |
| 4,338,070 A | * | 7/1982 | Nava | ..................... B29D 22/00 |
| | | | | 425/417 |

(Continued)

FOREIGN PATENT DOCUMENTS

| DE | 19859798 C1 | * | 12/1999 | ........... B29C 70/443 |
| DE | 102011115730 A1 | * | 4/2013 | ............. B29B 11/16 |

(Continued)

OTHER PUBLICATIONS

Chinese Office Action (w/ English translation) for corresponding Application No. 2020800595167, dated Nov. 22, 2023, 12 pages.
(Continued)

*Primary Examiner* — Benjamin A Schiffman
(74) *Attorney, Agent, or Firm* — Dority & Manning, P.A.

(57) ABSTRACT

A method for producing a component from a fiber-composite material includes introducing a fiber impregnated with a matrix onto the inner mold of a mold space formed between the inner mold and an outer mold, introducing a separating membrane onto the fiber impregnated with the matrix such that a cavity extending along the lateral surface of the outer mold is formed between the outer mold and the separating membrane, supplying a thermal oil to the cavity at a pressure that is greater than ambient pressure such that the thermal oil acts on the separating membrane at the pressure, heating the thermal oil to above a glass transition temperature of the matrix, and cooling the thermal to below the glass transition temperature of the matrix, wherein the pressure of the
(Continued)

thermal oil on the separating membrane is kept substantially constant at least during the cooling to below the glass transition temperature.

17 Claims, 3 Drawing Sheets

(51) Int. Cl.
    *B29C 65/00*     (2006.01)
    *B29C 70/46*     (2006.01)
    *B29L 31/30*     (2006.01)
    *B30B 5/02*     (2006.01)

(52) U.S. Cl.
    CPC ...... *B29C 66/81459* (2013.01); *B29C 70/446* (2013.01); *B29C 70/46* (2013.01); *B29C 70/462* (2013.01); *B30B 5/02* (2013.01); *B29C 2035/043* (2013.01); *B29L 2031/30* (2013.01); *Y02T 50/40* (2013.01)

(56) References Cited

U.S. PATENT DOCUMENTS

| | | | | |
|---|---|---|---|---|
| 5,152,949 | A * | 10/1992 | Leoni | B29C 43/3642 |
| | | | | 425/389 |
| 5,262,118 | A * | 11/1993 | Fukushima | B29C 70/086 |
| | | | | 473/319 |
| 5,378,134 | A * | 1/1995 | Blot | B29C 33/04 |
| | | | | 425/389 |
| 6,631,630 | B1 * | 10/2003 | Pourboghrat | B29C 70/44 |
| | | | | 72/63 |
| 7,866,969 | B2 * | 1/2011 | Ruiz | B29C 70/546 |
| | | | | 425/389 |
| 8,647,548 | B1 * | 2/2014 | Humfeld | B29C 70/44 |
| | | | | 264/258 |
| 8,741,208 | B2 * | 6/2014 | Nothdurft | B29C 70/48 |
| | | | | 425/389 |
| 8,828,309 | B2 * | 9/2014 | Ashida | B29C 35/007 |
| | | | | 264/40.3 |
| 9,181,407 | B2 * | 11/2015 | Mortimer | C08J 5/243 |
| 9,307,803 | B1 * | 4/2016 | Folgar | B29C 43/02 |
| 10,183,450 | B2 * | 1/2019 | Henrio | B29C 43/10 |
| 10,843,418 | B2 * | 11/2020 | Drees | B30B 15/047 |
| 11,919,258 | B2 * | 3/2024 | Schibsbye | B29C 43/52 |
| 12,083,750 | B2 * | 9/2024 | K?ffers | B30B 5/02 |
| 12,097,974 | B2 * | 9/2024 | K?ffers | B64C 1/064 |
| 2006/0117826 | A1 * | 6/2006 | Hellgren | B30B 5/02 |
| | | | | 72/63 |
| 2006/0182949 | A1 * | 8/2006 | Salnikov | C09J 163/00 |
| | | | | 428/327 |
| 2006/0233907 | A1 | 10/2006 | Ruiz et al. | |
| 2009/0068365 | A1 * | 3/2009 | Obermeyer | B29C 65/1406 |
| | | | | 427/207.1 |
| 2009/0151576 | A1 * | 6/2009 | Ito | B29C 63/04 |
| | | | | 100/305 |
| 2009/0155521 | A1 * | 6/2009 | Rodman | B29C 70/443 |
| | | | | 428/96 |
| 2013/0106021 | A1 * | 5/2013 | Monforte | B29C 43/52 |
| | | | | 264/320 |
| 2015/0158211 | A1 * | 6/2015 | Gensewich | B29C 43/12 |
| | | | | 425/388 |
| 2018/0229403 | A1 * | 8/2018 | Bamford, Jr. | B29C 35/045 |
| 2018/0281319 | A1 * | 10/2018 | Sebastian | B32B 37/10 |
| 2019/0091947 | A1 * | 3/2019 | Ogale | B29C 66/524 |
| 2019/0367716 | A1 * | 12/2019 | Hannig | B32B 27/32 |
| 2022/0363021 | A1 * | 11/2022 | K?ffers | B30B 5/02 |
| 2024/0025135 | A1 * | 1/2024 | Kojima | B29D 99/0028 |

FOREIGN PATENT DOCUMENTS

| | | | | |
|---|---|---|---|---|
| DE | 102016101631 A1 * | 8/2017 | ......... | B29C 70/446 |
| DE | 102017113595 | 12/2018 | | |
| DE | 102017113595 A1 | 12/2018 | | |
| EP | 3812139 A1 * | 4/2021 | ............ | B29C 51/28 |
| WO | WO 2010/118923 | 10/2010 | | |
| WO | WO 2014/195799 | 12/2014 | | |

OTHER PUBLICATIONS

PCT International Search Report and Written Opinion (w/ English translation) for corresponding Application No. PCT/EP2020/073054, mailed on Oct. 26, 2020, 18 pages.
German Office Action (w/ English translation) for corresponding Application No. DE102019005913.1, dated Apr. 28, 2020, 4 pages.

* cited by examiner

METHOD FOR PRODUCING A COMPONENT FROM A FIBER-COMPOSITE MATERIAL

CROSS-REFERENCE TO RELATED APPLICATIONS

The present application is a U.S. national phase application of International Application No. PCT/EP2020/073054, filed Aug. 18, 2020, which, in turn, claims the right of priority to German Application No. 102019005913.1, filed Aug. 22, 2019, the disclosures of both of which are hereby incorporated by reference herein in their entirety for all purposes.

TECHNICAL FIELD

The invention relates to a method for producing a component from a fiber-composite material, comprising the step of introducing a fiber impregnated with a matrix onto the inner mold of a mold space formed between the inner mold and an outer mold.

BACKGROUND OF THE INVENTION

Organic sheets that count among fiber-composite materials are known from the prior art and are primarily used in aircraft, ship, and automotive construction in order to obtain considerably lighter components compared with conventional materials along with comparable or even improved rigidity. Organic sheets of this kind generally have a fibrous woven fabric or a laid fiber web which is embedded in a thermoplastic matrix and, as fiber-matrix semi-finished products, often have glass, aramid, or carbon as the fiber material. Since organic sheets can be hot-formed in a simple manner by means of known metalworking methods, shorter processing times result compared with conventional thermosetting fiber-composite materials.

In general, organic sheets of this kind are used in the field of aircraft, ship, or vehicle construction in order to individually prefabricate components from fiber-composite material and assemble them in a subsequent final assembly step. The components are thus generally formed in a press by means of an inner mold and an outer mold, with the mold space between the inner mold and the outer mold corresponding to the component to be molded.

When producing the components by pressing, differing pressure distribution of the pressing pressure on the component may occur due to very slight unevennesses and the inner mold and the outer mold used not being completely congruent. In regions in which there was a lower pressing pressure during production, the finished component quite often has lower stability, since, owing to the lower pressure, the material was able to form fewer internal bonds, which can also be referred to as bridges. In particular with components having complex forms, i.e. components which have multiple curvatures, for example, the described problem is accentuated, since, in outer molds and inner molds having complex forms, the unevennesses increase and the congruence between the inner mold and outer mold decreases due to the lower manufacturing inaccuracies when producing the inner mold and outer mold.

DESCRIPTION OF THE INVENTION

Proceeding therefrom, the problem addressed by the present invention is to provide a method by means of which a component can be produced from a fiber-composite material having high strength and a complex form in a particularly simple manner.

The problem addressed by the invention is solved by the features of the independent claim. Advantageous configurations are found in the dependent claims.

Therefore, the invention relates to a method for producing a component from a fiber-composite material, comprising the steps of: introducing a fiber impregnated with a matrix onto the inner mold of a mold space formed between the inner mold and an outer mold, introducing a separating membrane onto the fiber impregnated with the matrix such that a cavity extending along the lateral surface of the outer mold is formed between the outer mold and the separating membrane, supplying a thermal oil to the cavity at a pressure that is greater than ambient pressure such that the thermal oil acts on the separating membrane at the pressure, heating the thermal oil to above a glass transition temperature of the matrix, and cooling the thermal oil to below the glass transition temperature of the matrix, wherein the pressure of the thermal oil on the separating membrane is kept substantially constant at least during the cooling to below the glass transition temperature.

In comparison with a forming method by means of a press known from the prior art, for example a C-frame pressure comprising a stationary inner mold and an outer mold that is movable only in the vertical direction for generating a pressing pressure having only vertical components, the proposed method is characterized in that the pressing pressure acting on the separating membrane and therefore on the fiber impregnated with the matrix owing to the thermal oil acts on every point of the separating membrane in the direction of the normal of the separating membrane and thus likewise in the direction of the normal of the component to be obtained or the fiber impregnated with the matrix. By using the thermal oil in the cavity formed between the separating membrane and the outer mold, the pressing pressure on the matrix is thus independent of any unevenness of the outer mold and/or inner mold. In comparison with a known press, the pressing or consolidation pressure required for forming is not brought about by the press, or is only partially brought about by the press, but instead is completely or substantially brought about by the thermal oil.

By means of the proposed heating of the thermal oil to above the glass transition temperature of the matrix and the subsequent cooling the thermal oil to below the glass transition temperature of the matrix, wherein the pressure of the thermal oil on the separating membrane is kept substantially constant at least during the cooling to below the glass transition temperature, it is ensured that the component obtained becomes particularly stable and has an improved structure and high breaking strength. In particular, by means of the proposed method, a component is obtained which has an internal bond content of >98%. Within the meaning of the invention, a pressure that is kept constant means that the pressure of the thermal oil is preferably the same during the cooling phase. A pressure that is kept substantially constant preferably means that the pressure does not change by more than +/−5% in the cooling phase.

The proposed method thus makes it possible, in a particularly simple manner, to form the fiber impregnated with the matrix under pressure and temperature into a component that is particularly stable, since, owing to the even pressure distribution during the production, many bridges can form in the material of the fiber impregnated with the matrix. The component produced in this way is thus particularly suitable for being used in aircraft, ships and/or vehicles. Proceeding from the basic concept of using thermal oil as a pressure and heating medium in the cavity between the outer mold and the separating membrane and keeping the pressure of the thermal oil substantially constant at least during the cooling to below the glass transition temperature, an equal consolidation pressure can be obtained on the entirety of the separating membrane, the bridge formation can be forced in the material in a positive manner, and a very stable component can be produced.

As a rule, the inner mold and the outer mold can have any shape, in particular a negative shape of the component to be obtained, as a cylinder and/or, in cross section, as a semicircle or so as to be semi-circle-like, flat, having a single or multiple curvature and/or so as to be arcuate. The method can be carried out using a press, with the inner mold constituting the lower die and the outer mold constituting the upper die in this case. More preferably, an inner mold and outer mold resting on one another at their edges are closed in a pressure-tight and/or sealing manner and/or rest on one another so as to be touching at their edges. In this context, the method preferably comprises the further step of positioning the outer mold on the inner mold such that the outer mold and inner mold rest on one another at their edges in a sealing manner to form the mold space.

While the method can be carried out with any fibers impregnated with the matrix as a rule, the fibers are preferably designed to be glass fibers, aramid fibers and/or carbon fibers. Most particularly preferably, the fiber is soaked with a thermoplastic matrix or impregnated with a thermoplastic matrix. In particular, the fiber impregnated with the matrix is designed to be a fiber-matrix semi-finished product, a fiber-composite material and/or an organic sheet, with these terms sometimes being used synonymously in the context of the invention. The fiber impregnated with the matrix is preferably designed to be a fiber soaked with a thermoplastic matrix and/or to be a glass-fiber-reinforced aluminum, also called GLARE, as a hybrid material. In general, glass-fiber-reinforced aluminum has many layers that are each only a few tenths of a millimeter thick and are alternately constructed from aluminum and a glass-fiber laminate, for example glass-fiber-reinforced plastics material.

More preferably, the fiber impregnated with the matrix may be configured as a laid fiber web or a woven fabric, in which reinforcing fibers are embedded in a plastics matrix. A laid scrim may equally be provided as the fiber, in particular in the form of a monoaxial or unidirectional laid scrim, which can be obtained by fixing a skein of parallel threads, in the form of a biaxial laid scrim, in which two skeins of parallel threads are fixed in the direction of two axes, or in the form of a multiaxial laid scrim, in which multiple skeins of parallel threads are fixed in the direction of different axes. Compared with woven fabrics, laid webs are distinguished by greater strength brought about by omitting the undulation that is unavoidable in woven fabrics. Furthermore, woven fabrics may contain a plurality of types of weave, such as a plain weave or twill weave.

The fiber impregnated with the matrix may contain what is known as a prepreg material and/or may be formed as a tape. Preferably, the fiber impregnated with the matrix is provided in the form of a continuous material. The matrix may be an epoxy-resin or thermoplastic matrix and also mixtures thereof. For example, the matrix may contain a polyphenylene sulfide or a polyether ketone, such as a polyaryletherketone (PAEK) or a polyether ether ketone (PEEK), as thermoplastic polymers. The prepreg material preferably has a thickness of 50 µm to 200 µm, for example around 180 µm, with carbon fibers contained therein preferably having a thickness of between 0.1 µm and 20 µm, for example 6 µm to 9 µm.

As already mentioned, during the method, the temperature of the thermal oil is increased to above the glass transition temperature of the matrix. Within the meaning of the invention, the glass transition temperature Tg is the gradual and reversible transition, taking place during a temperature increase or heating, in amorphous regions of the matrix from a hard and relatively brittle state into a viscous or rubber-like state. The glass transition temperature of the matrix can be determined by dynamic differential calorimetry, a thermal analysis method for measuring the amount of heat that is output or absorbed when the matrix is being heated or cooled. The glass transition temperature Tg of the matrix can be determined in accordance with the DIN 51007 standard, for example.

More preferably, during the method, the temperature of the thermal oil is heated to above the melting point of the matrix. The melting point of the matrix is preferably the temperature at which the matrix becomes very soft and no longer dimensionally stable, i.e. can no longer be brought back to its original shape. Preferably, the temperature of the thermal oil is at least 10° C., 20° C., 50° C., 100° C. or 200° C. greater than the melting point of the matrix.

The glass transition temperature and the melting point of the matrix are dependent on the chemical composition of the matrix. In the polyether ketones, the variable proportions of ether and carbon groups, inter alia, determine the physical properties, such as the level of the glass transition temperature and the melting point. In polyether ether ketone (PEEK), the melting point is approximately 335° C. and the glass transition temperature is approximately 143° C. In polyaryletherketone (PAEK), the melting point is approximately 373° C. and the glass transition temperature is approximately 152° C. The level of the glass transition temperature and the melting point may, however, vary depending on the production method and the exact composition of the plastics material.

The pressure of the thermal oil on the separating membrane when a thermal oil is supplied to the cavity at a pressure greater than ambient pressure is preferably at least 1 bar, 2 bar, 5 bar or 10 bar greater than the ambient pressure. More preferably, the pressure of the thermal oil on the separating membrane may be increased to a pressure of preferably at least 5 bar, 10 bar, 20 bar, 30 bar, or 40 bar greater than ambient pressure. More preferably, the pressure may also be kept constant while heating the thermal oil to above the glass transition temperature of the matrix.

According to another preferred development, it is provided that a heating rate during the heating of the thermal oil is higher than a cooling rate during the cooling of the thermal oil. The heating rate or cooling rate states how rapidly the temperature of the thermal oil changes. Slow cooling can preferably result in more bridges forming in the material and the component becoming particularly stable. Rapid heating in particular results in the production process not being prolonged unnecessarily. Preferably, the heating rate of the thermal oil is 20° C./min and the cooling rate is 10° C./min. More preferably, the heating rate of the thermal oil is 15° C./min and the cooling rate is 5° C./min. A heating rate of the thermal oil of 30° C./min and a cooling rate of 20° C./min are also possible.

As already mentioned, the method provides for heating and cooling the thermal oil. Between these steps and according to a preferred development, the method comprises the step of maintaining the temperature of the thermal oil above the glass transition temperature of the matrix for at least 10 minutes, preferably at least 20 minutes, more preferably at least 40 minutes. "Maintaining the temperature" in particular means that the temperature does not change in the maintenance phase. This preferably means that the temperature does not change by more than +/−5% in the maintenance phase. More preferably, it is provided that the temperature during the maintenance phase is not only above the glass transition temperature of the matrix, but is also above the melting point of the matrix. More preferably, the temperature of the thermal oil is maintained above the melting point of the matrix for at least 10 minutes, preferably at least 20 minutes, more preferably at least 40 minutes. Preferably, the temperature of the thermal oil is maintained to be at least 10° C., 20° C., 50° C., 100° C. or 200° C. greater than the melting point of the matrix.

The temperature curve for producing the component therefore preferably includes three phases: a heating phase, a maintenance phase, and a cooling phase. When the temperature curve is represented on a graph, i.e. when the temperature of the thermal oil is plotted against time, the temperature curve can be trapezoidal. This means that the heating phase and the cooling phase take a certain length of time and that the thermal oil is preferably not heated or cooled instantaneously or suddenly. Preferably, the length of the heating phase is 20 minutes, 30 minutes, 40 minutes, or 60 minutes. More preferably, the length of the cooling phase is 20 minutes, 30 minutes, 40 minutes, 60 minutes, 80 minutes, or 120 minutes, with the cooling phase preferably being longer than the heating phase.

As already mentioned, the method comprises the step of cooling the thermal oil to below the glass transition temperature of the matrix. Preferably, it is also provided that the temperature of the thermal oil after cooling is at least 10° C., 20° C., 50° C. or 100° C. less than the glass transition temperature of the matrix. In particular, it is provided that the temperature after cooling is substantially room temperature, i.e. in a range of between 15 and 35° C.

According to another preferred development, the method comprises the step of heating the thermal oil to a temperature of ≥250° C., ≥300° C., or ≥400° C., and cooling the thermal oil to a temperature of ≤80° C., ≤100° C., ≤150° C., or ≤200° C. Preferably, the temperature of the thermal oil is selected depending on the matrix used and its glass transition temperature and melting point. More preferably, the thermal oil is maintained at a temperature of ≥250° C., ≥300° C., or ≥400° C. in the maintenance phase. Preferably, the thermal oil is supplied to the cavity at a temperature of from 350° C. to 410° C. and the thermal oil is cooled to 30° C.

During the production of the component, preferably not only is the temperature of the thermal oil changed, but also the pressure that the thermal oil brings about on the separating membrane. According to a preferred development, the method comprises the step of increasing the pressure of the thermal oil on the separating membrane to ≥3 bar, ≥5 bar, or ≥10 bar before, during and/or after heating to above the glass transition temperature of the matrix. Preferably, the pressure of the thermal oil is increased in the heating phase of the thermal oil. The pressure can be increased before the glass transition temperature is reached, as the glass transition temperature is reached, or after the glass transition temperature is exceeded. Particularly preferably, the pressure of the thermal oil is increased in the maintenance phase of the temperature. This preferably means that the pressure of the thermal oil is particularly preferably increased after the glass transition temperature of the matrix is exceeded.

The method may furthermore comprise the step of maintaining the pressure of the thermal oil on the separating membrane at ≥3 bar, ≥5 bar, or ≥10 bar for at least 80 minutes, preferably at least 120 minutes, more preferably at least 180 minutes. In particular, it is provided that the pressure is kept constant in this maintenance phase, i.e. its value does not change within +/−5%, for example.

According to another preferred development, the method comprises the step of reducing the pressure of the thermal oil on the separating membrane substantially to ambient pressure after cooling the thermal oil to below the glass transition temperature of the matrix. In particular, the pressure of the thermal oil can be reduced after the cooling phase of the thermal oil.

Similarly to the temperature curve, the pressure curve preferably comprises three phases, a pressure-increase phase, a pressure-maintenance phase, and a pressure-reduction phase. When the pressure is plotted on a graph against time, the pressure curve can be trapezoidal. Alternatively, the pressure curve can be almost rectangular, i.e. can comprise a virtually instantaneous pressure increase and pressure reduction.

Preferably, it is provided that a pressure-increase rate when increasing the pressure of the thermal oil on the separating membrane substantially corresponds to a pressure-reduction rate when reducing the pressure of the thermal oil on the separating membrane. This means that the pressure is built up and relieved substantially equally rapidly. In particular, this means that the pressure-increase rate is the same as the pressure-reduction rate or is the same as the pressure-reduction rate+/−5%.

More preferably, it is provided that the maintenance phase of the pressure begins before or during the maintenance phase of the temperature. In other words, this preferably means that, in the first case, the pressure is already being kept substantially constant at a pressure of ≥3 bar, ≥5 bar, or ≥10 bar while the thermal oil is still being heated. In the second case, this preferably means that the pressure is kept substantially constant at a pressure of ≥3 bar, ≥5 bar, or ≥10 bar only in the maintenance phase of the temperature of the thermal oil at a temperature of greater than the glass transition temperature of the matrix.

According to another preferred development, the method comprises the steps of increasing the pressure of the thermal oil, reducing the pressure of the thermal oil, heating the thermal oil and cooling the thermal oil, wherein the pressure of the thermal oil on the separating membrane can be changed independently of the temperature of the thermal oil. In particular, it is provided that the pressure can be changed independently of the temperature being changed, and that the temperature can be changed independently of the pressure being changed. In other words, this preferably means that the pressure of the thermal oil does not rise because the thermal oil is heated, or that the pressure falls because the thermal oil is cooling.

According to another preferred configuration, the method comprises the step of introducing a stringer, a frame and/or a thickened portion into a recess in the inner mold, in particular before introducing the fiber impregnated with the matrix. Stringers, frames and/or thickened portions may be local reinforcements, for example for window, door and/or hatch openings in a vehicle, ship, or aircraft, and/or structural braces which can be incorporated by means of the proposed method step when producing the shaped part. The component can take any complex shape by incorporating the stringer, the frame and/or the thickened portion. When melting the fiber impregnated with the matrix by supplying thermal oil to the cavity at the temperature that is greater than the melting point of the matrix, connection contact surfaces of the stringers, frames and/or thickened portions are melted and connected to the fiber-composite material in this way. The recess is preferably formed by a milling process, for example, such that, when a stringer, frame and/or thickened portion is placed into the recess, it is flush with the lateral surface of the inner mold. The stringer, frame and/or thickened portion is preferably inserted into the recess as a prefabricated and consolidated component.

According to a preferred development, the method comprises the step of cooling the inner mold to a temperature of ≤150° C., ≤200° C., or ≤250° C., or, after the preceding step, cooling the inner mold to a temperature of ≤150° C., ≤200° C., or ≤250° C. in the region of the stringer, the frame and/or the thickened portion. Preferably, a plurality of supply ducts which extend axially through the inner mold and are arranged around the recess are provided for this purpose in the region of the stringer, the frame and/or the thickened portion. This can ensure that the stringer, frame and/or thickened portion provided in the recess does melt onto the relevant connection contact surface due to the heated thermal oil, but that the remaining part of the stringer, frame and/or thickened portion remains below a softening temperature.

With regard to the component to be formed, according to a preferred development, it is provided that the method is carried out using a press that has the inner mold and the outer mold, wherein the inner mold and/or the outer mold is designed to mold an aircraft component, a ship component, or a vehicle component. As a rule, the inner mold and the outer mold can have any shape, with the inner mold and the outer mold preferably being designed to produce a component of an aircraft, a ship, or a vehicle. Furthermore, the component may be a rotor blade of an aircraft or a wind turbine.

According to a preferred development, a press that has the inner mold and the outer mold, in particular a C-frame press, is provided, and/or, after introducing the separating membrane, the method comprises the step of tensioning the inner mold and the outer mold relative to one another until the mold space is formed. The outer mold and the inner mold are preferably designed such that the mold space is pressure-tight after tensioning. The press preferably comprises a press frame, in particular a C-frame, which comprises an upper horizontal C-leg, a lower horizontal C-leg and a vertical C-base, which interconnects the upper C-leg and the lower C-leg.

Preferably, the inner mold is supported in a stationary manner on the lower horizontal C-leg as a lower die and the outer mold is supported on the upper C-leg as an upper die via a press cylinder such that, by actuating the press cylinder, the inner mold and the outer mold can be tensioned relative to one another until the mold space is formed. The C-frame is preferably designed in a frame construction, with a plurality of C-shaped, interconnected press frames being able to be provided one behind the other in the longitudinal direction. The individual press frames are preferably interconnected by clamping elements. In addition to an above-described downstroke press, in which the press cylinder is supported on the upper C-leg, the press can likewise have an upstroke construction, such that the inner mold can be tensioned by the press cylinder against the outer mold provided on the upper C-leg.

According to a preferred development, the fiber impregnated with the matrix comprises a pre-consolidated semi-finished shell and/or pre-consolidated individual layers. The fiber, which is in particular soaked with the thermoplastic matrix, can also comprise a fibrous woven fabric and/or a laid fiber web which is embedded in the thermoplastic matrix. In woven fabrics and laid webs, fibers can extend at right angles to one another in order to define mechanical properties such as rigidity, strength and/or thermal expansion in an improved manner compared with materials known from the prior art, such as metal sheets.

Most particularly preferably, the same thermal oil is used for the heating, i.e. when supplying the thermal oil to the cavity at the temperature that is greater than the melting point of the matrix, and for the subsequent cooling. In other words, the thermal oil found in the cavity is preferably cooled during a pumping process and is supplied to the cavity again while the thermal oil continues to act on the separating membrane at the pressure greater than ambient pressure.

According to a preferred development, the method comprises the step of preheating the outer mold and/or the inner mold to a base temperature, in particular before introducing the fiber impregnated with the matrix. To do this, heating and/or cooling ducts can be provided in the outer mold and/or the inner mold for temperature-controlling the relevant mold before and/or during curing. The heating ducts and/or cooling ducts preferably extend in the axial direction at regular intervals and/or so as to be distributed over the entire lateral surface of the relevant mold. In order to supply thermal oil to the cavity, supply channels are preferably provided for the thermal oil which extend in the radial direction through the outer mold.

According to a more preferred configuration, the method comprises the step of applying a negative pressure to the lateral surface of the inner mold. Preferably, the inner mold is provided with a plurality of negative-pressure ducts at regular intervals along the lateral surface which can extend in the radial direction through the lower mold and/or are connected to a vacuum pump by means of which the negative pressure can be generated. In an analogous manner, a heating and/or cooling apparatus can be provided in order to preheat or cool the outer mold and/or the inner mold to the base temperature by means of the heating and/or cooling ducts.

As a rule, there are various options for configuring the inner mold and/or the outer mold. According to a particularly preferred development, the inner mold and/or the outer mold are made of invar. Invar is an iron-nickel alloy with a very low thermal expansion coefficient, meaning that an inner mold and/or outer mold made of this material is characterized by extremely low expansion due to the change in temperature caused by the thermal oil.

Since the pressure is greater than ambient pressure both when heating the thermal oil to a temperature greater than the glass transition temperature of the matrix and when cooling the thermal oil to below the glass transition temperature of the matrix, there is preferably no pressureless phase during the forming. The fiber, which is in particular soaked with the thermoplastic matrix, preferably has a thickness comparable to that of the cavity, such that, owing to its substantially higher thermal capacity, the thermal oil is sufficient for bringing about the melting process for forming the fiber, which is in particular soaked with the thermoplastic matrix.

BRIEF DESCRIPTION OF THE DRAWINGS

In the following, the invention will be explained in greater detail on the basis of a preferred embodiment with reference to the accompanying drawings, in which.

DETAILED DESCRIPTION OF THE EMBODIMENTS

Figure 1:
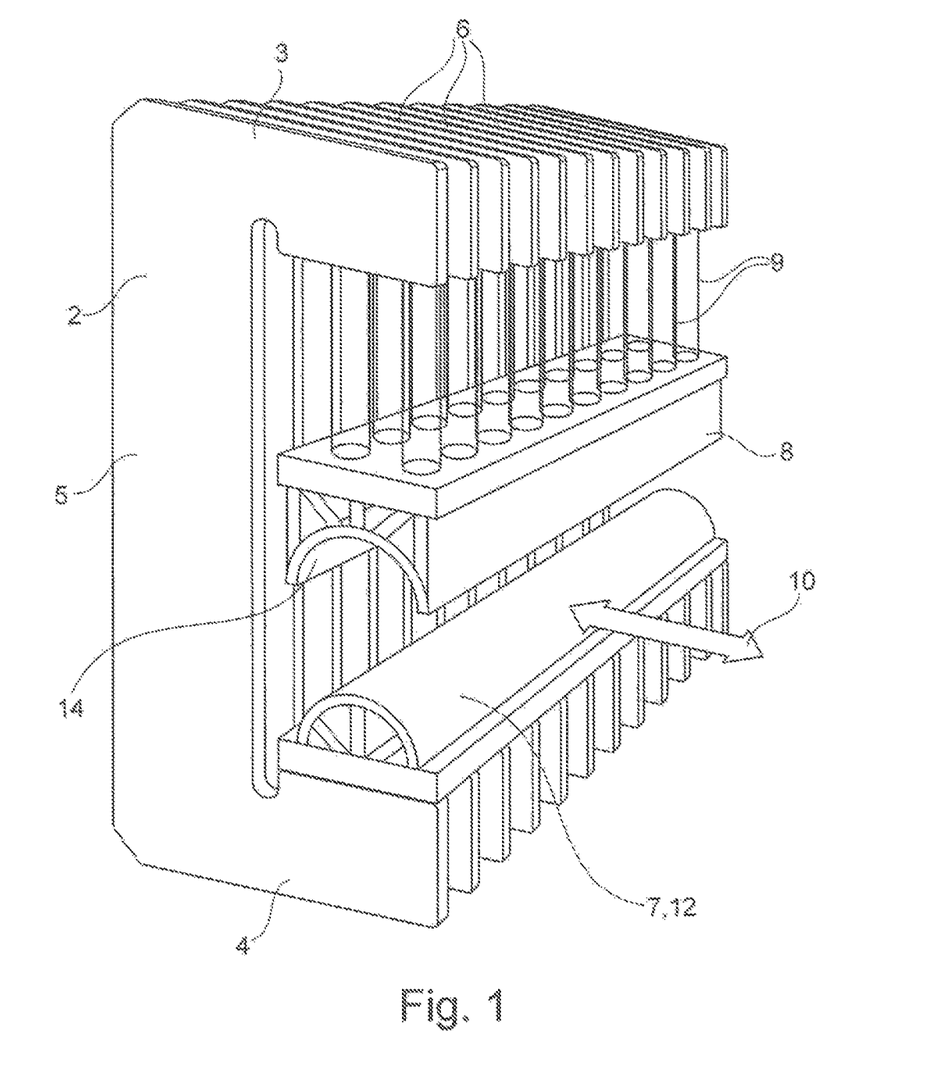
FIG. 1 is a schematic perspective view of a device for carrying out the method for producing a component from a fiber-composite material according to an embodiment of the invention.

FIG. 1 shows a device in the form of a C-frame press for performing a method for producing a component of an aircraft made of an organic sheet as a fiber-composite material. The C-frame press comprises a press frame, designed as a C-frame 2, having an upper horizontal C-leg 3, a lower horizontal C-leg 4 and a vertical C-base 5, which interconnects the upper C-leg 3 and the lower C-leg 4. The press is designed in a frame construction and comprises a plurality of C-shaped, interconnected press frames 6 arranged one behind the other in the longitudinal direction of the press.

A cylinder-like inner mold 7 is provided on the lower C-leg 4. The inner mold 7 is convex and is designed to be semi-circle-like in cross section, with a cylinder diameter of 6 m. In the longitudinal direction, the inner mold 7 extends between its ends at a cylinder height of 15 m. An outer mold 8 that is congruent with the inner mold 7, i.e. is likewise cylinder-like and accordingly concave, is provided above the inner mold 7. A plurality of press cylinders 9 are supported on the upper C-legs 3 and act on the outer mold 8. In this way, the outer mold 8 can be moved in the vertical direction by the press cylinder 9 in the sense of a cross beam, i.e. opening the mold space in order to remove the component 1 from the device configured in this way, as indicated by the arrow 10.

Figure 2:
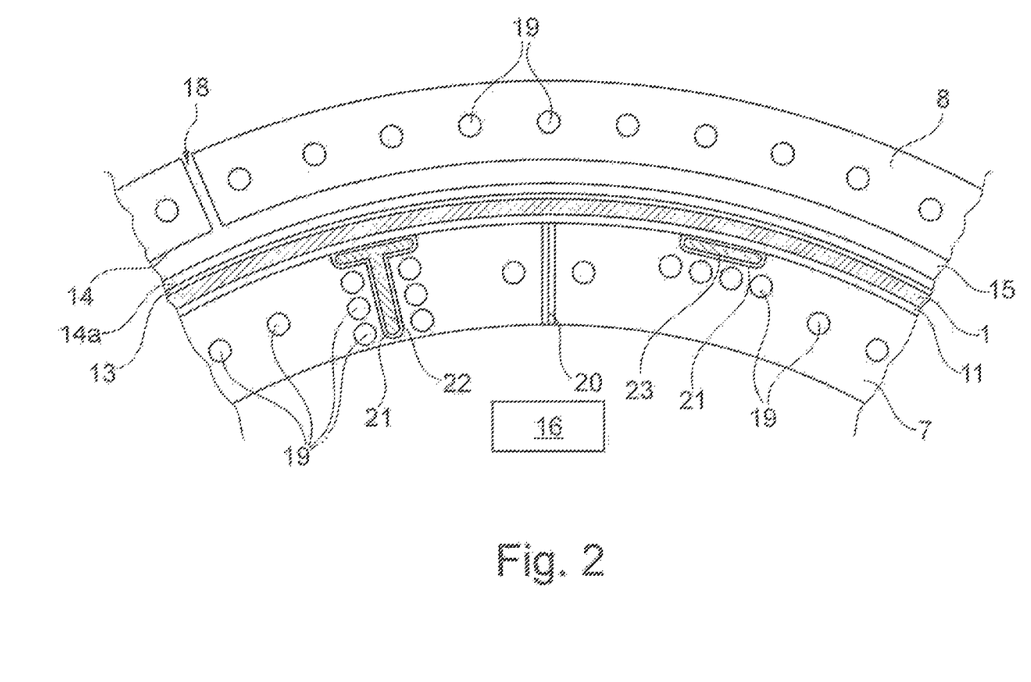
FIG. 2 is a schematic sectional view of a detail of the device shown in FIG. 1, comprising the inner mold and outer mold.

With reference to the schematic sectional view of a detail of the inner mold 7 and outer mold 8 resting on one another, as shown in FIG. 2, in the situation shown in FIG. 1 in which the outer mold 8 is at a distance from the inner mold 7, a separating agent 10, indicated in FIG. 2, is sprayed onto the inner mold 7. A fiber soaked with a thermoplastic matrix, in particular a glass fiber, aramid fiber and/or carbon fiber, is then applied to the inner mold 7 in the form of a pre-consolidated semi-finished shell or in pre-consolidated individual layers in the form of what is known as an organic sheet, such that the organic sheet 7 covers the entire lateral surface 12 of the cylinder-like inner mold 7 up to the edges of the inner mold 7.

In an optional step, a separating film 13 is applied to the fiber 1 soaked with the thermoplastic matrix in the form of an anti-adhesion layer. The separating film 13 is in turn covered with a separating membrane 14 made of metal, which likewise covers the entire lateral surface 12 of the inner mold 7.

The outer mold 8, as shown in FIG. 2, is then arranged above the inner mold 7 such that a cavity 15 forms between the lateral surface 14 of the outer mold 8. In this way, the cavity extends over the entire lateral surface 14 of the outer mold 8 and has an approximately consistent thickness of between 2 and 5 mm. The inner mold 7 and the outer mold 8 are made of invar iron-nickel alloy and are configured such that, when the outer mold 8, as shown in FIG. 2, rests on the inner mold 7 to form the cavity 15, the inner mold 7 and the outer mold 8 are closed in a sealing manner or rest on one another so as to be touching at the edges of their respective lateral surfaces 12, 14.

The device comprises a thermal-oil temperature-control and pressure apparatus 16, which is first of all designed to supply thermal oil 17 to the cavity 15 such that a certain pressure is exerted on the separating membrane due to the thermal oil 17. Since the thermal oil 17 can be freely distributed within the cavity 15 along the entire lateral surface 14 of the outer mold 8, the pressure acts on every point of the separating membrane 14a in the direction of the normal of the lateral surface 12 of the inner mold 7 and in the extension direction of the fiber 1 soaked with the thermoplastic matrix. Furthermore, the thermal oil can be temperature-controlled, i.e. heated and cooled, by the thermal-oil temperature-control and pressure apparatus 16.

The thermal oil 17 is therefore used as a pressure, heating, and cooling medium in order to exert a constant consolidation pressure on the fiber soaked with the thermoplastic matrix on the entirety of the separating membrane 14a and to allow for targeted, consistent heating of the fiber 1 soaked with the thermoplastic matrix and for targeted, consistent cooling. With its thermal capacity that is considerably higher than that of the fiber 1 soaked with the thermoplastic matrix, by means of the thermal oil 17 the melting process of the fiber 1 soaked with the thermoplastic matrix is brought about in this way.

The production method provides that the thermal oil 17 is heated to above a glass transition temperature of the matrix and is cooled to below the glass transition temperature of the matrix, with the pressure of the thermal oil 17 on the separating membrane 14a being kept substantially constant at least during the cooling to below the glass transition temperature.

Figure 3:
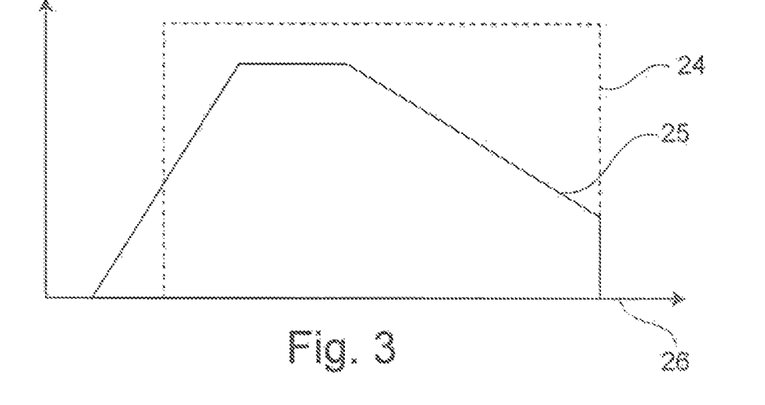
FIG. 3 shows an exemplary pressure and temperature curve for the method according to an embodiment of the invention.
Figure 4:
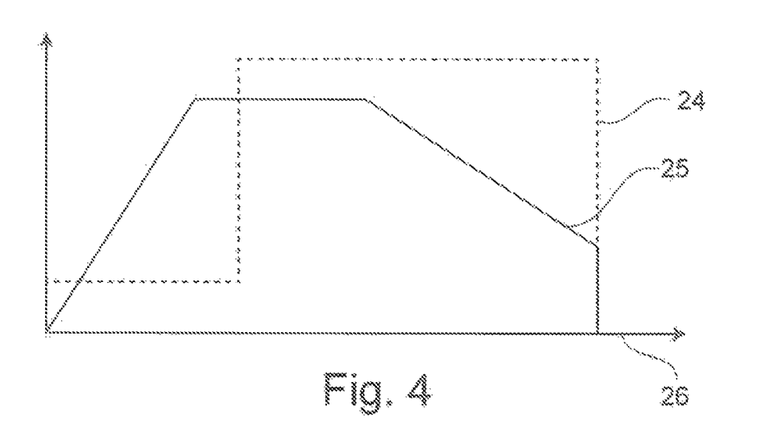
FIG. 4 shows an exemplary pressure and temperature curve for the method according to another embodiment of the invention.
Figure 5:
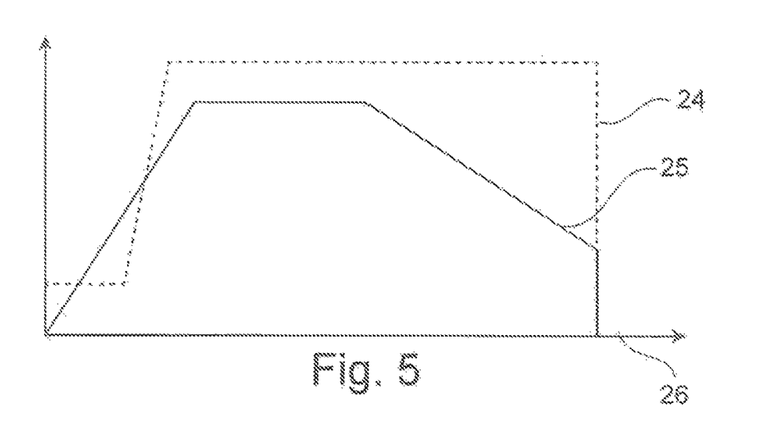
FIG. 5 shows an exemplary pressure and temperature curve for the method according to yet another embodiment of the invention.

FIGS. 3, 4 and 5 show three exemplary pressure curves 24 and temperature curves 25. The values for the pressure and temperature of the thermal oil 17 have been plotted against time 26 on a graph. In the present embodiments, the fiber 1 soaked with the thermoplastic matrix is a prepreg material. In this embodiment, the plastics matrix is made of a polyaryletherketone (PAEK) and has a glass transition temperature of 147° C. and a melting point of 305° C. This fiber is a carbon fiber.

In FIG. 3, the thermal oil 17 is heated from room temperature to 350° C. In this sense, the thermal oil is heated to above the glass transition temperature and the melting point of the matrix, with the heating rate being approximately 20° C./min. During the heating, the pressure of the thermal oil 17 is increased from ambient pressure to 18 bar. The pressure increase essentially takes place suddenly, i.e. within a very short time frame, such that FIG. 3 shows a vertical rise in the pressure curve 24. The pressure increase for the thermal oil takes place at a temperature of 200° C. The pressure is therefore increased when the temperature has exceeded the glass transition temperature of 147° C. but the melting point of 305° C. has not yet been reached. After the pressure increase, the pressure is kept constant at 18 bar. During the maintenance phase for the pressure, which lasts for 80 minutes, the thermal oil 17 is heated further until it has reached the temperature of 350° C. This temperature is maintained for 12 minutes. The cooling phase for the thermal oil 17 then begins, with the thermal oil being cooled at a cooling rate of 10° C./min. The thermal oil 17 is cooled to 100° C., i.e. to below the glass transition temperature of 147° C., while the pressure of the thermal oil is kept constant. At 100° C., the pressure of the thermal oil is reduced, with this essentially taking place suddenly, as for the pressure increase. The pressure curve 24 in FIG. 3 is therefore substantially rectangular, while the temperature curve 25 is trapezoidal.

In FIG. 4, the thermal oil 17 is heated from 25° C. to 365° C. The thermal oil 17 is thus heated to above the glass transition temperature and the melting point of the matrix, with the heating rate being approximately 10° C./min. The heating phase lasts for approximately 35 minutes. The temperature of the thermal oil 17 is then maintained at 365° C. for 40 minutes. The pressure is approximately 2 bar during the entirety of the heating phase. Only during the maintenance phase for the temperature is the pressure increased from 2 bar to 10 bar. This pressure increase essentially takes place suddenly, i.e. within a very short time frame, such that FIG. 4 shows a vertical rise in the pressure curve 24. The pressure increase in the thermal oil 17 takes place once the thermal oil 17 has been maintained at 365° C. for 10 minutes. After the pressure increase, the pressure is kept constant at 20 bar. The maintenance phase for the temperature is ended after 40 minutes and the thermal oil 17 is cooled at a cooling rate of 3° C./min. The pressure continues to be kept constant at 20 bar during the cooling. The thermal oil 17 is cooled to 100° C., i.e. to below the glass transition temperature of 147° C., while the pressure of the thermal oil is kept constant. The cooling phase lasts for approximately 85 minutes. The pressure of the thermal oil is then reduced to ambient pressure, with this essentially taking place suddenly, as for the pressure increase.

FIG. 5 shows another exemplary pressure and temperature curve. Analogously to FIG. 4, the thermal oil 17 is heated from 25° C. to 365° C., i.e. to above the glass transition temperature and the melting point of the matrix, with the heating rate being approximately 10° C./min. The heating phase lasts for approximately 34 minutes. The temperature of the thermal oil 17 is then maintained at 365° C. for 50 minutes. At the beginning of the heating, for the first 17 minutes, the pressure is 2 bar. The pressure is then increased to 12 bar, at which it is maintained. The pressure is increased when the thermal oil has reached approximately 200° C. The pressure increase does not take place suddenly, but instead over approximately 10 minutes at a pressure-increase rate of approximately 1 bar/min. The maintenance phase for the pressure of 12 bar is therefore reached before the maintenance phase for the temperature of 365° C. The maintenance phase for the temperature is ended after 50 minutes and the thermal oil 17 is cooled to a temperature of 100° C. at a cooling rate of 5° C./min. The pressure continues to be kept constant at 12 bar during the cooling. The cooling phase lasts for approximately 50 minutes. After this, i.e. when approximately 100° C. is reached, the pressure of the thermal oil is reduced, with this essentially taking place suddenly.

FIG. 2 also shows that various supply ducts 18, which extend radially through the outer mold 8, are provided for introducing the thermal oil 17 into the cavity 15 in the outer mold 8. For the heating and cooling, axially extending heating and/or cooling ducts 19 are provided in the inner mold 7 and the outer mold 8, as a result of which preheating, cooling and/or temperature control of the corresponding mold is possible. By means of a vacuum duct 20 provided in the inner mold 7 and extending radially through the inner mold 7, negative pressure can be applied to the lateral surface 12 of the inner mold 7.

Recesses 21 are provided in the inner mold 7, into which a stringer 22 (on the left) and a thickened portion 23 (on the right) are inserted, as shown in FIG. 2. A plurality of cooling ducts 19, which enclose the relevant recess 19, are arranged adjacently to the respective recesses 21. While connection contact surfaces of the stringer 22 or the thickened portion 23 are melted by the thermal oil 17 and can be connected to the fiber 1 soaked with the thermoplastic matrix, the cooling ducts 19 arranged around the recess 21 are used for cooling the stringer 22 or the thickened portion 23 so that they remain below a softening temperature.

After the shaped part 1 has cured, the outer mold 8 can be raised, as shown in FIG. 1, and the shaped part 1 can be removed from the mold space formed by the inner mold 7 and outer mold 8. The inner mold 7 and outer mold 8 can be designed to mold half of an aircraft fuselage, as shown in FIG. 1, but it is also possible to mold any other parts, for example an aircraft wing or an aircraft propeller by means of the proposed method and the device in a particularly simple manner.

The embodiments described are merely examples which can be modified and/or supplemented in various ways in the context of the claims. Any feature that has been described for a particular embodiment can be used on its own or in combination with other features in any other embodiment. Any feature that has been described for an embodiment in a particular category can also be used in a corresponding manner in an embodiment in another category.

LIST OF REFERENCE SIGNS

Component, fiber impregnated with a matrix 1
C-frame 2
Upper C-leg 3
Lower C-leg 4
C-base 5
Press frame 6
Inner mold 7
Outer mold 8
Arrows 9
Arrow 10
Separating agent 11
Lateral surface (of the inner mold) 12
Separating film 13
Lateral surface (of the outer mold) 14
Separating membrane 14a
Cavity 15
Thermal-oil temperature-control and pressure apparatus 16
Thermal oil 17
Supply duct 18
Heating and/or cooling duct 19
Vacuum duct 20
Recess 21
Stringer 22
Thickened portion 23
Pressure curve 24
Temperature curve 25
Time axis 26

The invention claimed is:

1. Method for producing a component from a fiber-composite material, comprising the steps of:
introducing a fiber impregnated with a matrix onto an inner mold of a mold space formed between the inner mold and an outer mold, introducing a separating membrane onto the fiber impregnated with the matrix such that a cavity extending along a lateral surface of the outer mold is formed between the outer mold and the separating membrane, supplying a thermal oil to the cavity at a pressure that is greater than ambient pressure such that the thermal oil acts on the separating membrane at the pressure, heating the thermal oil to above a glass transition temperature of the matrix, and cooling the thermal oil to below the glass transition temperature of the matrix, wherein the pressure of the thermal oil on the separating membrane is kept substantially constant at least during the cooling to below the glass transition temperature, wherein a substantially constant pressure comprises the pressure not changing by more than ±5% during the cooling phase.

2. Method according to claim 1, wherein a heating rate during the heating of the thermal oil is higher than a cooling rate during the cooling of the thermal oil.

3. Method according to claim 1, comprising the step of:
maintaining the temperature of the thermal oil above the glass transition temperature of the matrix for at least 10 minutes.

4. Method according to claim 1, comprising the step of:
heating the thermal oil to a temperature of ≥250° C., and cooling the thermal oil to a temperature of ≤80° C.

5. Method according to claim 4, comprising the step of:
increasing the pressure of the thermal oil on the separating membrane to ≥3 bar at least one of before, during or after heating to above the glass transition temperature of the matrix.

6. Method according to claim 5, comprising the step of:
maintaining the pressure of the thermal oil on the separating membrane at ≥3 bar for at least 80 minutes.

7. Method according to claim 6, comprising the step of:
reducing the pressure of the thermal oil on the separating membrane substantially to ambient pressure after cooling the thermal oil to below the glass transition temperature of the matrix.

8. Method according to claim 7, wherein a pressure-increase rate when increasing the pressure of the thermal oil on the separating membrane substantially corresponds to a pressure-reduction rate when reducing the pressure of the thermal oil on the separating membrane.

9. Method according to claim 8, wherein the method comprises the steps of increasing the pressure of the thermal oil, reducing the pressure of the thermal oil, heating the thermal oil and cooling the thermal oil, wherein the pressure of the thermal oil on the separating membrane can be changed independently of the temperature of the thermal oil.

10. Method according to claim 1, comprising at least one of the steps of
preheating the outer mold and/or the inner mold to a base temperature before introducing the fiber impregnated with the matrix, and
applying a negative pressure to the lateral surface of the inner mold.

11. Method according to claim 1, comprising the step of introducing at least one of a stringer, a frame or a thickened portion into a recess in the inner mold before introducing the fiber impregnated with the matrix.

12. Method according to claim 11, comprising the step of cooling the inner mold to a temperature of ≤150° C. in a region of at least one of the stringer, the frame, and the thickened portion.

13. Method according to claim 1, comprising the step of cooling the inner mold to a temperature of ≤150° C.

14. Method according to claim 1, comprising a C-frame press that has the inner mold and the outer mold.

15. Method according to claim 1, wherein the fiber impregnated with the matrix comprises at least one of a pre-consolidated semi-finished shell or pre-consolidated individual layers.

16. Method according to claim 1, comprising a press that has the inner mold and the outer mold, wherein at least one of the inner mold or the outer mold is designed to mold at least one of an aircraft component, a ship component, or a vehicle component.

17. Method according to claim 1, whereby after introducing the separating membrane, the step of tensioning the inner mold and the outer mold relative to one another until the cavity is formed.

* * * * *